(12) United States Patent
Kirschbauer

(10) Patent No.: US 9,150,363 B2
(45) Date of Patent: Oct. 6, 2015

(54) TURNING DEVICE FOR IDENTIFICATION OBJECTS

(75) Inventor: Maximilian Kirschbauer, Bad Koetzting (DE)

(73) Assignee: Muehlbauer GmbH & Co. KG, Roding (DE)

( * ) Notice: Subject to any disclaimer, the term of this patent is extended or adjusted under 35 U.S.C. 154(b) by 0 days.

(21) Appl. No.: 14/241,266

(22) PCT Filed: Aug. 30, 2012

(86) PCT No.: PCT/EP2012/066817
§ 371 (c)(1),
(2), (4) Date: Mar. 14, 2014

(87) PCT Pub. No.: WO2013/030252
PCT Pub. Date: Mar. 7, 2013

(65) Prior Publication Data
US 2014/0360840 A1   Dec. 11, 2014

(30) Foreign Application Priority Data
Sep. 2, 2011   (DE) .................. 10 2011 112 317

(51) Int. Cl.
*B65G 47/24* (2006.01)
*B65G 47/248* (2006.01)
*G06K 13/07* (2006.01)

(52) U.S. Cl.
CPC .............. *B65G 47/248* (2013.01); *G06K 13/07* (2013.01); *B65H 2301/33214* (2013.01); *B65H 2301/33224* (2013.01)

(58) Field of Classification Search
CPC ............... B65G 47/248; B65G 47/252; B65H 2301/33214; B65H 2301/33222; B65H 2301/33224
USPC ................. 198/375, 379, 402, 403, 410, 411; 414/758, 759; 271/184, 185, 186; 400/188
See application file for complete search history.

(56) References Cited

U.S. PATENT DOCUMENTS

| 4,613,747 | A | 9/1986 | McCarthy | |
|---|---|---|---|---|
| 5,102,290 | A | * | 4/1992 | Cipolla ........................ 198/375 |
| 5,962,832 | A | | 10/1999 | Dorner |
| 6,082,617 | A | | 7/2000 | Meyer-Wittreck |
| 7,063,013 | B2 | * | 6/2006 | Jones et al. ..................... 101/40 |
| 7,416,179 | B2 | * | 8/2008 | Jones et al. ..................... 271/65 |
| 7,800,015 | B2 | | 9/2010 | Jantos |
| 8,646,770 | B2 | * | 2/2014 | Meier et al. ..................... 271/81 |

\* cited by examiner

*Primary Examiner* — William R Harp
(74) *Attorney, Agent, or Firm* — John A. Miller; Miller IP Group, PLC

(57) ABSTRACT

A device for turning over identification objects comprising a receiving device for holding an identification object, wherein the receiving device can be moved from an initial position along a guide, and a first rolling element, which is rotatably received in the receiving device, wherein the first rolling element comprises a blocking device, which permits rotation of the receiving device in a first direction. The first rolling element, during movement along the first bearing, performs a rotation in the first direction and the receiving device performs a rotation in the first direction via the first rolling element. During an opposite movement of the receiving device, the first rolling element performs a rotation in a second direction opposite to the first direction, wherein the blocking device prevents rotation of the receiving device.

20 Claims, 5 Drawing Sheets

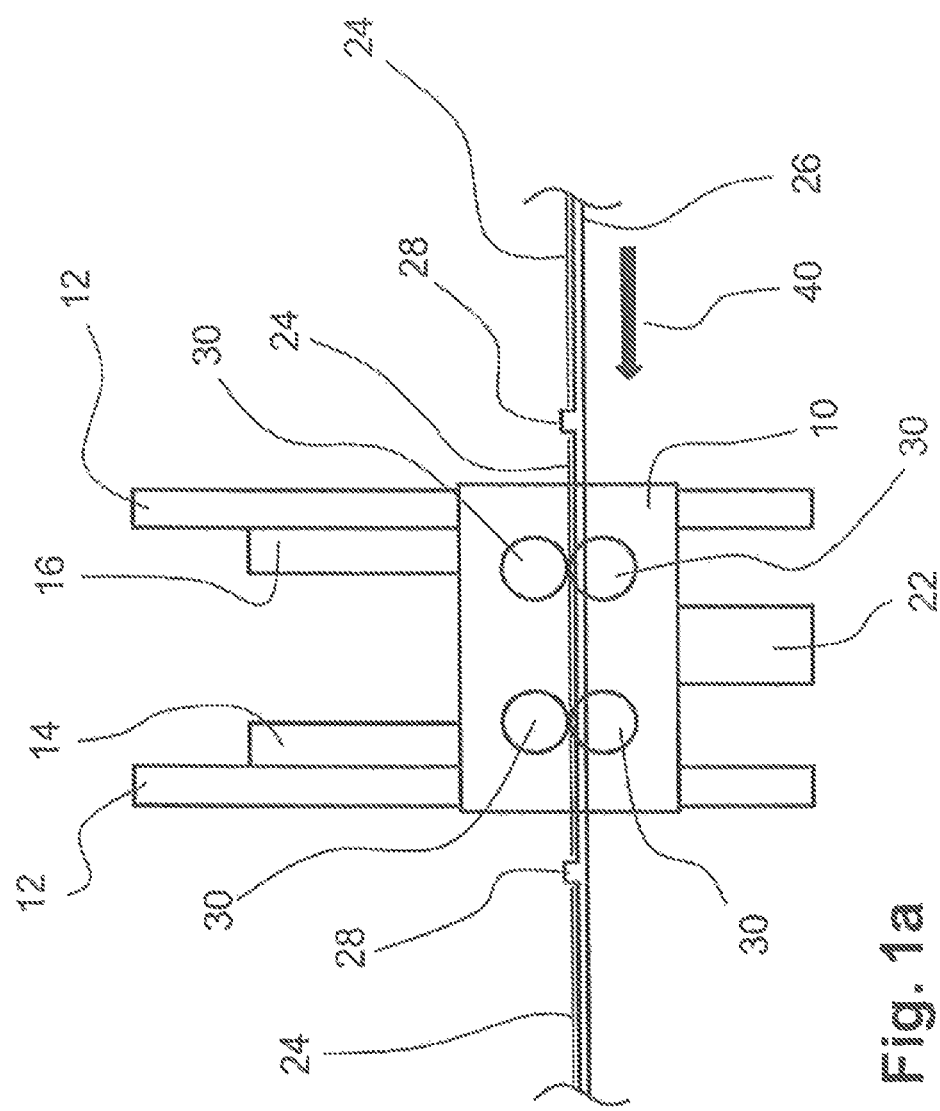

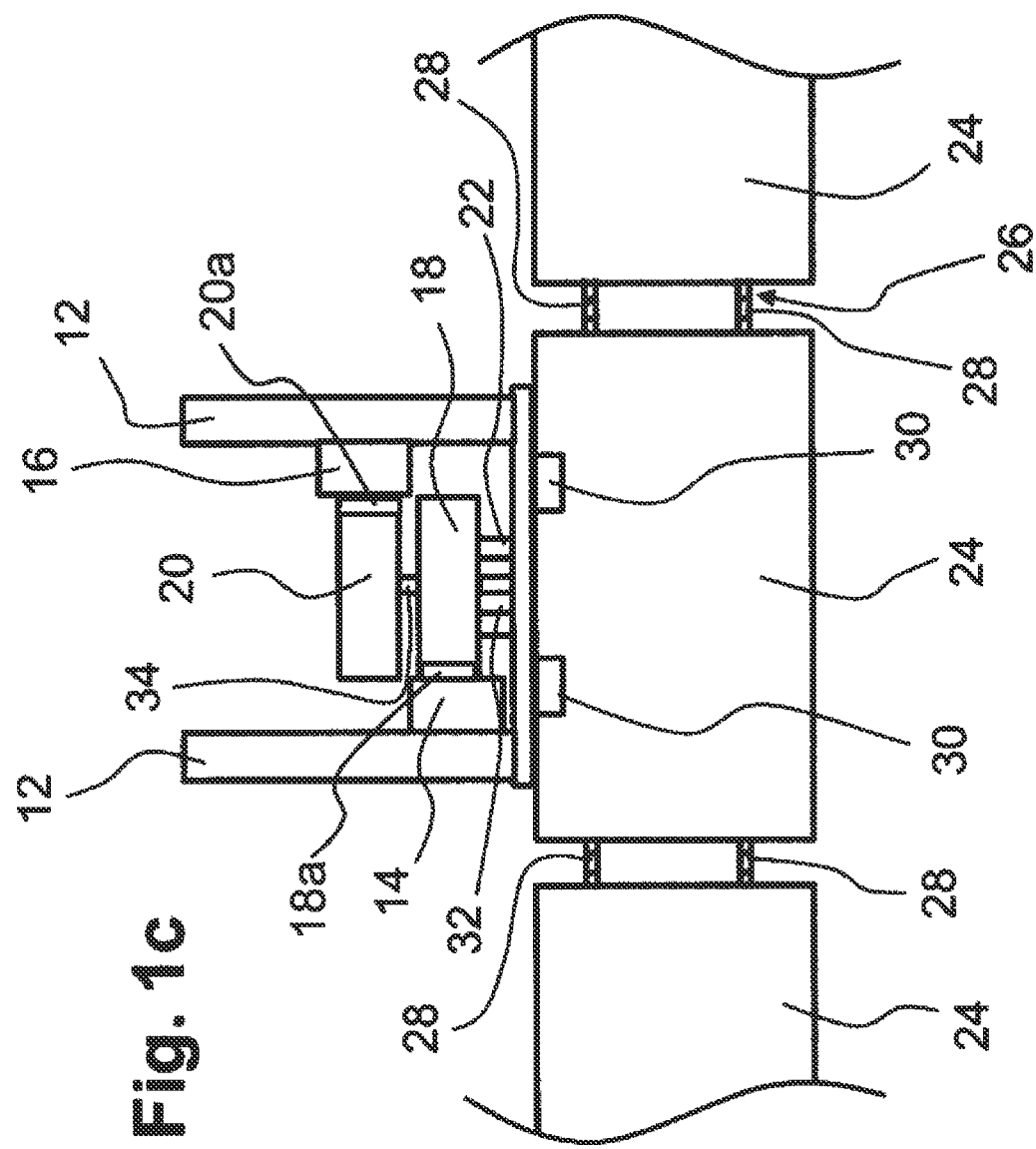

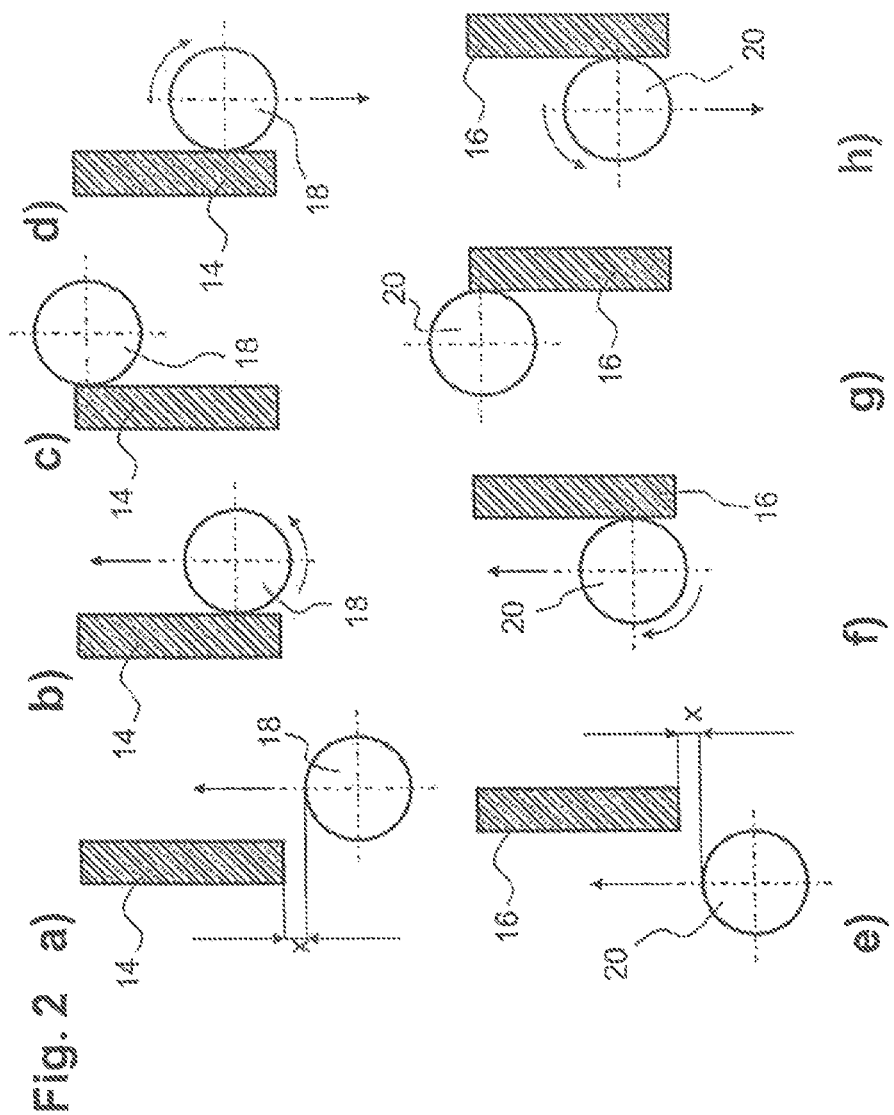

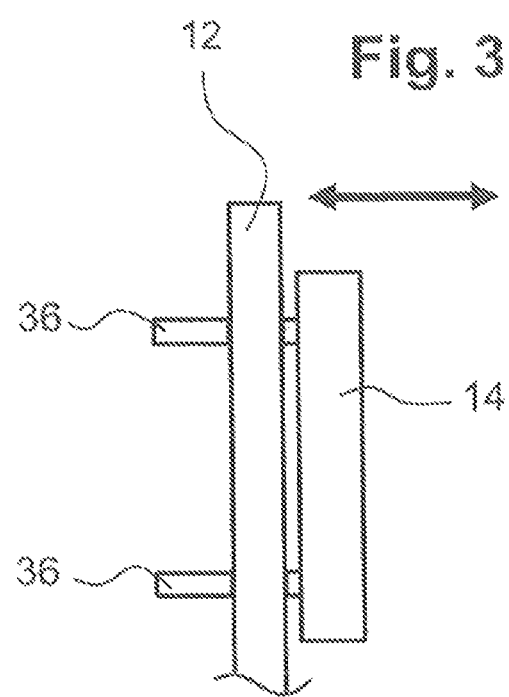

TURNING DEVICE FOR IDENTIFICATION OBJECTS

TECHNICAL FIELD

A device for turning over identification objects is described, which enables turning by means of a receiving device, in which the identification objects are held. Identification objects, inter alia, comprise ID cards, smart cards as well as safety documents, such as e.g. identity cards.

BACKGROUND

In the processing of identification objects, a system for carrying out processing steps includes stations where these steps are performed. These stations are frequently installed or configured such that processing is performed in one direction only on one side of the identification objects. This means that identification objects, which are supplied to these stations on a conveyor, can be processed either on their front or rear side. However, if it is intended to process the respective other side, the identification objects have to be turned over to enable processing by these stations or other stations.

Identification objects are, for example, ID cards which have to be personalized, i.e. provided with personal data, such as e.g. the name, the photograph and an identification number associated with this person or other data, both on the front side and on the rear side. Furthermore, ID cards may comprise a chip and/or magnetic stripe which are accordingly provided with data. The ID cards are supplied to a first station on a conveyor where, for example, the front side is provided with the name and photograph of a person. In addition, the rear side must be imprinted with an identification number. It is entirely possible to provide two opposite printing stations below and above the conveyor for simultaneous processing of ID cards, wherein both the front side and the rear side are provided with the respective information. However, such a system would take up considerably more installation space.

A further disadvantage of such arrangements is that pressure is applied to the ID card during application of the personal information. The pressure may move the ID card out of its position on the conveyor when imprinted from below. An inaccurate and/or incomplete imprinting of the ID cards would result therefrom. Moreover, it would be possible that the ID card moves out of a recess in the conveyor provided for the ID card due to the imprinting and thus causes a stop in the processing or personalization process and a damage to the system.

Even simultaneous printing from above and below in order to ensure the position of the ID card on the conveyor may result in an inaccurate or incomplete personalization result. It is possible that the ID card is bent by a certain amount by the pressure applied to various locations on the ID card by the printing stations.

Furthermore, conveyors having a recess for identification objects are frequently used. Thus, they can be firmly held in position within this recess. Removal due to gravity during printing from above can be excluded owing to the positioning on the conveyor.

However, it is thus necessary to turn identification objects over during personalization, i.e. to rotate them in such a manner that both the front side and the rear side can be imprinted, for example, from above.

PRIOR ART

In conventional devices for personalizing cards, the cards are rotated by 180° during personalization, i.e. turned from their front side to their rear side.

For example, a turning device is known, in which a plurality of steps are performed using various components for effecting a turning of the identification object.

For example, a card is supplied to a turning device on a conveyor and the conveyor is stopped in a turning position. A gripping device having a separate drive is then brought into position with respect to the card. The gripping device grips the card, wherein gripping elements are closed and opened via a short stroke cylinder. Subsequent thereto, the gripping device is brought into a position above the conveyor by a lifting device having a separate lifting drive. The distance between the conveyor and the position of the non-turned card is at least greater than half of the length of the card.

Subsequent thereto, the card is rotated by 180° by a pivoting cylinder connected to the gripping device. After turning of the card, the card is again deposited on the conveyor being correspondingly rotated by 180°.

However, other turning devices are known from the prior art as well.

For example, DE 197 09 561 A1 describes a system for processing chip and/or magnetic stripe cards, wherein a card can be turned over in a transport and positioning device for inscription of the rear side thereof. The transport and positioning device comprises a device for transporting the cards which is connected to a rotary disk. The rotary disk is driven by a drive motor via a drive belt so that the device and thus the card located therein can be turned over.

EP 0 838 782 A2 describes a device for personalizing identification cards. The device comprises a turning station with two opposite disks interconnected by struts. The side walls comprise guides for guiding cards and pairs of rollers for transporting the cards through the turning station. After the card has been supplied to the turning station, the turning station is rotated by 180°, wherein the card is meanwhile transported through the turning station by the pairs of rollers. Once the turning station is rotated by 180°, the card is output from the turning station via a pair of rollers. In addition, contacting devices for data reading/writing of a chip of the card can be provided in the turning station.

However, in such devices, there is a relatively great demand for space which must be provided for these devices. Especially in systems performing different operations in any case and thus comprising a plurality of components, provision of a large installation space for an individual turning station proves to be disadvantageous.

In the prior art devices, these high space requirements also result from the fact that these devices comprise a plurality of components, such as e.g. a plurality of drive units or a relatively large rotary disk with a drive belt.

In addition, a plurality of steps for implementing the turning of an identification object or card are required in the known devices. Moreover, the path to be travelled by the identification object or card during turning is relatively long, thus increasing the required space.

Furthermore, the amount of control effort is thus increased as well.

The throughput of identification objects or cards is limited also owing to the above disadvantages. Furthermore, a turning process per identification object or card lasts relatively long so that processing stations downstream of the turning station must be operated depending on the throughput of the turning station. This is highly disadvantageous in view of systems, in which a plurality of processing steps is performed.

Underlying Problem

The problem is thus to provide a turning device having a simple structure which takes up little space and enables fast turning over of identification objects.

Solution

A device for turning over identification objects solving this problem comprises a receiving device including a device for holding an identification object, wherein the receiving means can be moved from an initial position along a guide. The device further comprises a first bearing, which is arranged on the guide in the direction of movement of the receiving device, and a first rolling element, which is rotatably received in the receiving device. The first rolling element comprises a blocking device, which permits rotation of the receiving device in a first direction only by means of the first rolling element. Furthermore, the device comprises a drive, which is adapted to move the receiving device along the guide. After movement of the receiving device from the initial position, the first rolling element contacts the first bearing. During movement along the first bearing by means of the drive, the first rolling element performs a rotation in the first direction. The receiving device performs a rotation in the first direction via the first rolling element. During an opposite movement of the receiving device by means of the drive, the first rolling element performs a rotation in a second direction opposite to the first direction, wherein the blocking device prevents rotation of the receiving device.

The device thus enables turning over of identification objects in very short period of time and merely requires a drive for carrying out a complete turning process. Moreover, the device comprises only few components and requires little installation space. Furthermore, the identification object is not moved far from the initial position, which also reduces the required space.

Advantages and Configurations

A simple rotation of an identification object results from the movement of the receiving device along the first bearing and the contact of the first rolling element with the first bearing. Depending on the length of the first bearing and the path travelled by the receiving device along the guide, naturally an arbitrary rotation of the identification object may take place. That is to say that the identification object cannot only be turned, i.e. rotated by 180° but, for example, by 45° or 360°. This is suitable, for example, for a complete inspection of an identification object (each side of an identification object) by means of an optical inspection device.

The configuration of the first rolling element, for example size and volume, can be chosen such that a specific rotation of the first rolling element and thus of the receiving device is achieved. This has an effect on the amount by which the receiving device is rotated. In addition to the blocking device, the first rolling element can comprise a gear transmission, such as a planetary gear, to have an effect on the amount of rotation of the receiving device.

In addition, the guide can comprise a second bearing, located at the level of the first bearing, which is opposite to the first bearing in an offset manner, and the receiving device can comprise a second rolling element, which is rotatably mounted to the receiving device. The second rolling element comprises a blocking device, which only permits rotation of the receiving device in the first direction by means of the second rolling element. The identification object is rotated by 90° by means of the first rolling element and rotated by further 90° by means of the second rolling element. Since turning of the identification object by 180° is effected via two rolling elements, the receiving device has to be moved by half of the path only by the drive as compared to a device having only one rolling element. When rotated, each one of the rolling elements causes a rotation of the receiving device in the first direction. For achieving this, the first and second bearings are opposite to each other in an offset manner so that the first and second rolling elements cause a rotation of the receiving device in the first direction both when moving the receiving device from the initial position and when moving the receiving device into the initial position. Thus, the space required for the device and for turning the identification object is further reduced. Furthermore, the turning time is reduced as well, since the receiving device has to be moved along a shorter path in the guide and part of the turning process is effected when returning the receiving device.

The configuration of the second rolling element can correspond to that of the first rolling element.

The drive can be configured as a hydraulic cylinder, pneumatic cylinder or linear drive unit. Furthermore, the drive can also be provided by means of other devices. An electric motor is to be mentioned by way of example which directly or indirectly, via further means, causes movement of the receiving device along the guide. For example, the linear drive unit can provide the drive of the receiving device by means of a pinion and a gear rack.

The first and/or second bearings and/or the first and/or second rolling elements can be rubberized. Thus, the friction between rolling element and bearing required for rotation is ensured, thereby achieving a corresponding rotation of the rolling elements and the receiving device. The bearing(s) and the rolling element(s), respectively, can also be coated with a different material causing a corresponding amount of friction or coated otherwise for ensuring a corresponding amount of friction and rotation. In addition, it can be sufficient to coat only the rolling elements or bearings with a material or otherwise.

Alternatively, the first and/or second bearings can be configured as a gear rack and the first and/or second rolling elements may be configured as a gear wheel. Thus, a defined rotation of the rolling elements is ensured. Even when configured as gear wheels, the first and second rolling elements comprise a blocking device so that rotation of the receiving device by means of the rolling elements is possible in one direction only in each case. In addition, the configuration of the rolling elements or the rolling element, depending on the choice of the gear wheel, enables affecting the amount by which the receiving device is rotated. For example, the size and/or number of teeth or toothing can be varied. Similarly, the amount of rotation can be affected by the configuration of the gear rack(s) in a corresponding manner.

The blocking devices of the first and/or second rolling elements can comprise a free wheel. The free wheel permits rotation of the receiving device, which is connected to the free wheel, in one direction only via the first and/or second rolling elements. However, other devices for blocking the rolling elements in one direction can be used as well.

The identification objects can be supplied by a conveyor device. For example, the identification objects rest on a conveyor belt, wherein the conveyor belt is configured in a manner defining receiving areas for identification objects.

The device for holding the identification object can comprise two successive pairs of opposite rollers in the direction of transport of the identification objects. They are adapted for resiliently receiving an identification object therebetween.

Thus, it is possible to convey an identification object to the device and to push it between the pairs of rollers. Thus, the device does not impair the transport or conveyance of identification objects. When an identification object is located between the pairs of rollers and is not moved any further, the resiliently mounted or resiliently acting rollers cause the identification object to be held in position thereby.

In further embodiments of the device, the first and/or second bearings can be arranged on the guide in such a manner that the first and/or second rolling elements only contact the first and/or second bearings after the receiving device has been moved from the initial position by a certain amount. Thus, collision of the identification object, for example, with a conveyor device and obstruction of the turning process caused by a too early rotation of the identification object is prevented.

The first and/or second bearings can also be configured as a bar arranged on the guide along the direction of movement of the receiving device.

In some embodiments of the device, a distance between the first and/or second bearings and the first and/or second rolling elements can be adjustable. Further means, such as e.g. threaded pins, enabling variation of the distance can be provided at the guide. For this purpose, the first and/or second bearings is/are mounted to the guide such that it/they can be displaced perpendicularly to the direction of movement of the receiving device.

Furthermore, the first rolling element and the second rolling element can have a common axis of rotation.

BRIEF DESCRIPTION OF THE DRAWINGS

Further objects, features, advantages and possible applications are apparent from the following description of non-limiting embodiments made with reference to the associated drawings. All described and/or graphically illustrated features, per se or in any combination, define the subject matter disclosed herein, irrespective of their grouping in the claims or the dependencies thereof. The dimensions and proportions of the components shown in the Figures are not necessarily to scale; they may vary from what is illustrated in embodiments to be implemented.

FIG. 1a shows a schematic front view of a device for turning over identification objects and a conveyor device, FIG. 1c is shows a schematic top view of a device for turning over identification objects and a conveyor device, FIGS. 2a-2h schematically show the mode of operation of a device for turning over identification objects, and FIG. 3 schematically shows an adjustable bearing of a device for turning over identification objects.

DETAILED DESCRIPTION OF THE EMBODIMENTS

Figure 1B:
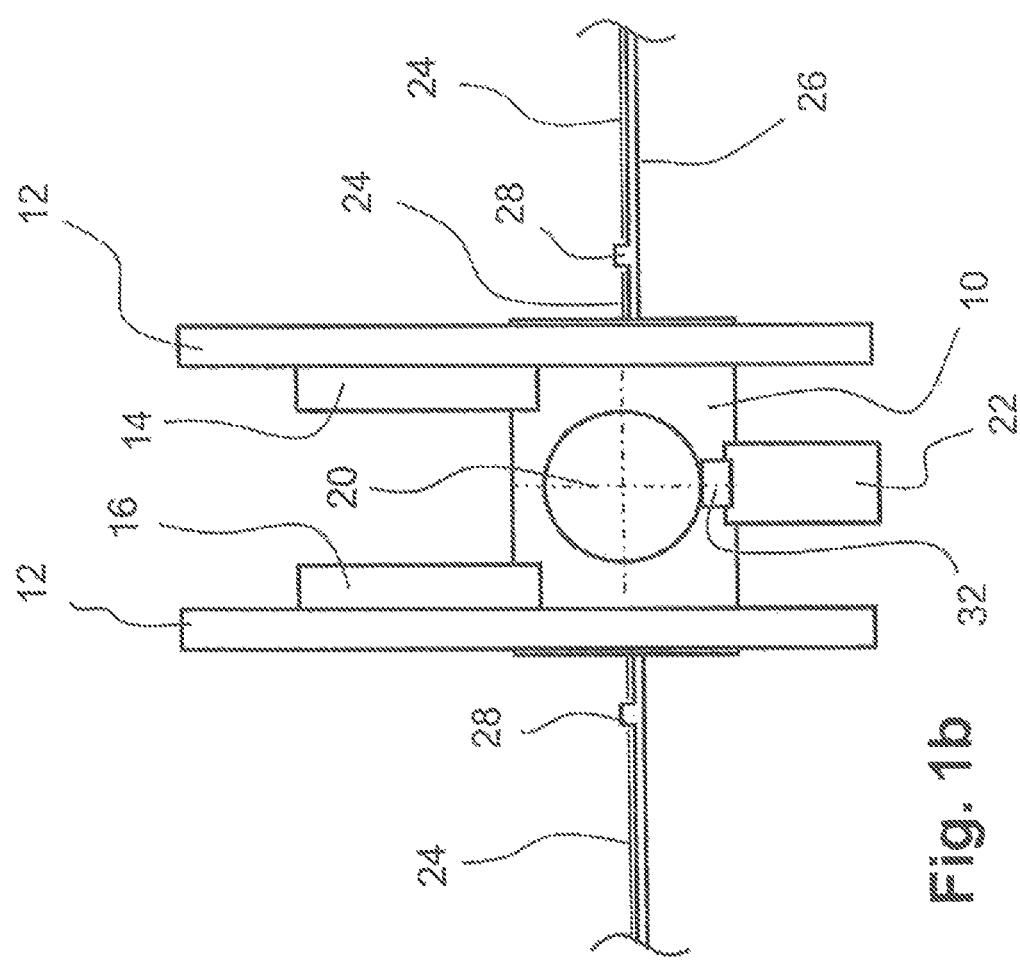
FIG. 1b shows a schematic rear view of a device for turning over identification objects and a conveyor device.

FIG. 1a is shows a schematic front view of a device for turning over identification objects and a conveyor device for supplying and removing identification objects, wherein it is referred to a turning device in the following. Moreover, turning devices for cards are described in the following, wherein the cards are to be regarded as an example of identification objects only and the illustrated turning devices can equally be used for identification objects of any kind.

The turning device shown in FIG. 1a comprises a guide 12 consisting of two opposite parts in the shown embodiment. A first bearing 14 is attached to the part of the guide 12 shown on the left side in FIG. 1a is and a second bearing 16 is attached to the part of the guide 12 shown on the right side in FIG. 1a.

A receiving device 10 for identification objects 24 configured as cards is attached to the guide 12, which receiving device can be moved along the guide 12 by a drive unit 22. In this embodiment, the drive unit 22 is configured as a pneumatic cylinder and further comprises a drive member 32 (not shown in FIG. 1a) which serves the purpose of moving the receiving device 10. The guide 12 is adapted for guiding the receiving device 10 and thus comprises guiding means. For this purpose, the guide 12 can comprise a guiding groove (not shown) and the receiving device 10 can have a corresponding configuration so that the receiving device 10 is guided in the guiding groove of the guide 12.

First and second rolling elements 18 and 20 (not shown in FIG. 1a) are also attached to the receiving device 10. The first and second rolling elements 18 and 20 comprise blocking devices 18a and 20a, respectively, permitting transmission of a rotational movement of the first or second rolling element 18, 20 to the receiving device 10 in one direction only in each case. The blocking devices 18a and 20a of the first and second rolling elements 18 and 20 can comprise a free wheel. The free wheel permits rotation of the receiving device 10, which is connected to the free wheel, in one direction only via the first and second rolling elements 18 and 20. However, other devices for blocking the rolling elements 18 and 20 in one direction can also be used.

Furthermore, a device for holing identification objects (cards) 24 is provided in the receiving device 10, which device is constituted by two pairs of opposite rollers 30 in the embodiment shown here. The rollers 30 are resiliently mounted so that cards 24 can be moved to the receiving device 10 via a conveyor device 26 in the direction of transport (illustrated by arrow 40). When the conveyor device 26 is stopped in a receiving position, in which the receiving device 10 receives the cards 24, the force provided by the resiliently mounted rollers 30 and acting on the card 24 kept in the receiving position is sufficient to firmly hold the identification object/card 24.

The conveyor device 26 comprises elevations 28 which serve the purpose of defining receiving areas for the cards 24. The distance between two elevations in the direction of transport is chosen, in size, such that an identification object/card 24 assumes a defined position and orientation therein. The elevations 28 also facilitate carrying identification objects/cards 24 from a receiving position, in which the rollers 30 keep the identification object/card 24 by means of a pressure prevailing between the rollers 30, and transporting them to the receiving position. The elevations 28 thus "push" the identification object/card 24 through the rollers 30. An identification object/card 24 remains in the receiving position and is retained by the rollers 30 only if the transport of the identification objects/cards 24 is stopped at least locally in the receiving position.

In addition, the turning device comprises further components and component parts which have been omitted for the sake of clarity. A turning device can comprise, for example, sensors for detecting the positions of the identification objects/cards 24, the first and second rolling elements 18 and 20 and the receiving device 10.

FIG. 1b shows a schematic rear view of a turning device and a conveyor device 26 for supplying and removing identification objects/cards 24. The turning device and the conveyor device 26 correspond to the structure of the turning device of FIG. 1a, wherein FIG. 1b shows the second rolling element 20. The first rolling element 18 is arranged behind the second rolling element 20 in FIG. 1b and is thus not shown in FIG. 1b.

Furthermore, a drive member 32 is shown, which is connected to the drive unit 22 and serves the purpose of moving the receiving device 10 along the guide 12.

The second rolling element 20 contacts the second bearing 16 after movement of the receiving device 10 from an initial position. In the initial position, the receiving device 10 is positioned such that identification objects/cards 24 can be supplied thereto via the conveyor device 26. In the shown embodiment, the first and second rolling elements 18 and 20 have a rubber coating for ensuring sufficient friction in order to achieve a rotational movement.

FIG. 1c is shows a schematic top view of a turning device for turning over cards 24 and a conveyor device 26. The turning device and the conveyor device 26 shown in FIG. 1c correspond to the structure of the turning devices of FIGS. 1a and 1b.

FIG. 1c is shows the arrangement of the first and second bearings 14 and 16 and the arrangement of the first and second rolling elements 18 and 20. As illustrated in FIGS. 1a and 1b, the first and second bearings 14, 16 are substantially located at the same level and have the same dimensions. However, the first and second bearings 14, 16 are arranged offset to one another so that they are not directly opposite to each other. Accordingly, the associated rolling elements 18, 20 are arranged such that the first rolling element 18 can contact the first bearing 14 and the second rolling element 20 can contact the second bearing 16. The first and second rolling elements 18, 20 are attached to the receiving device 10 in such a manner that, upon rotation of the first rolling element 18 in a first direction, due to the contact with the first bearing 14, caused by a movement of the receiving device 10 by means of the drive unit 22 and the drive member 32, the receiving device 10 also performs a rotation in the first direction turning the card 24. However, when the receiving device 10 is returned to its initial position, the first rolling element 18 performs a rotation in a second direction opposite to the first direction due to the contact with the first bearing 14. However, the blocking device of the first rolling element 18 prevents rotation of the receiving device 10 in the second direction.

Accordingly, the second rolling element 20 performs a rotation due to the contact with the second bearing 16, when the receiving device 10 is moved from its initial position by means of the drive unit 22 and the drive member 32. However, due to the blocking device of the second rolling element 20, the receiving device 10 does not perform a rotation. When the receiving device 10 is returned to its initial position, the second rolling element 20 performs a rotation and the receiving device 10 also performs a corresponding rotation.

The shaft 34 is shown in FIG. 1c is only to show that the first and second rolling elements 18 and 20 are connected to the receiving device 10. Depending on the configuration of the blocking devices of the first and second rolling elements 18, 20, a single shaft firmly connected to the receiving device 10 can be provided. In a not shown embodiment, the rolling elements 18, 20 are arranged on a common first shaft, wherein the first shaft is connected to a second shaft via a gear belt and to the receiving device 10 via a gear rack or such like. That means, when the first shaft performs a rotation, the receiving device 10 is correspondingly rotated as well. However, the blocking devices of the first and second rolling elements 18, 20 cause the first rolling element 18 to transfer a rotational movement to the first shaft when rotated in a first direction, and not to transfer a rotational movement to the first shaft when rotated in a second direction. The second rolling element 20 also transfers a rotational movement to the first shaft when rotated in a first direction and does not transfer a rotational movement to the first shaft when rotated in a second direction. In this case, the blocking devices can be configured as free wheels.

Since the bearings 14, 16 are opposite to each other in an offset manner, the first rolling element 18 only causes a rotation of the receiving device 10 when the receiving device 10 is moved from the initial position and the second rolling element 20 only causes a rotation of the receiving device 10 when the receiving device 10 is moved into the initial position.

FIG. 2 schematically shows the mode of operation of a turning device. FIGS. 2a) to d) show the first rolling element 18 and the first bearing 14, and FIGS. 2e) to h) show the second rolling element 20 and the second bearing 16.

In FIG. 2a), the first rolling element 18 and the receiving device 10 connected thereto are in the initial position. The first rolling element 18 is then displaced towards the first bearing 14 in the direction of the arrow parallel to the first bearing 14 via the movement of the receiving device 10 by means of the drive unit 22 and the drive member 32. In the initial position of the receiving device 10, the first rolling element 18 is spaced from the first bearing 14 by a certain amount x.

The first rolling element 18 contacts the first bearing 14, as shown in FIG. 2b), after the first rolling element 18 has been moved from the initial position of the receiving device 10 by a certain amount x due to the movement of the receiving device 10. Since the first rolling element 18 is moved further in the direction of the arrow, the first rolling element 18 performs a rotational movement in the first direction, as indicated by the arrow. Due to the connection of the first rolling element 18 and the receiving device 10, the receiving device 10 also performs a rotational movement in the first direction corresponding to the rotational movement of the first rolling element 18. The rotation of the receiving device 10 in the first direction is permitted by the blocking device of the first rolling element 18. The movement of the receiving device 10 is effected by the drive unit 22 not shown in FIG. 2 and the not shown drive member 32.

In FIG. 2c), the first rolling element 18 is in its topmost position at the first bearing 14, in which the receiving device 10 and the card 24 held by the receiving device 10 are rotated by 90°.

When the receiving device 10 is returned to the initial position of the receiving device 10 by means of the drive unit 22 and the drive member 32, the first rolling element 18 performs a rotational movement in a second direction. However, the blocking device of the first rolling element 18 prevents a rotation of the receiving device 10 so that the same is not returned to its original orientation prior to the rotation by 90°.

FIG. 2e) shows the second rolling element 20 in the initial position of the receiving device 10 and the second bearing 16, wherein the second rolling element 20 is connected to the receiving device 10. In the initial position of the receiving device 10, the second rolling element 20 is spaced from the second bearing 16 by a certain amount x.

While the receiving device 10 is moved upwards by the drive unit 22 and the drive member 32 and the receiving device 10 performs a rotation in the first direction via the first rolling element 18, the second rolling element 20, once in contact with the second bearing 16, performs a rotational movement in the second direction, as shown in FIG. 2f). However, the blocking device of the second rolling element 20 prevents transmission of the rotational movement of the second rolling element 20 to the receiving device 10.

In FIG. 2g), the second rolling element 20 is in its topmost position at the second bearing 16. The receiving device 10 and the card 24 located in the receiving device 10 being rotated by 90° via the first rolling element 18.

While the receiving device 10 does not perform a rotational movement via the first rolling element 18 when the receiving device 10 is returned to the initial position of the receiving device 10 by the drive unit 22 and the drive member 32, the receiving device 10 is rotated in the first direction via the second rolling element 20 by further 90°, as shown in FIG. 2h).

Once the receiving device 10 is returned to its initial position, the receiving device 10 and the card 24 held therein are rotated by 180°.

Due to the interaction of the first and second rolling elements 18, 20, a turning of identification objects/cards 24, i.e. a rotation of identification objects/cards 24 by 180° is effected along a short path.

In the illustrated embodiment, both moving identification objects/cards 24 out of the receiving areas of the conveyor device 26 and turning of the identification objects/cards 24 is effected only by a drive unit linearly moving the receiving device 10.

FIG. 3 schematically shows an adjustable bearing of a turning device. The first bearing 14 is moveable (illustrated by the black double arrow) relative to a part of the guide 12 via threaded pins 36 for varying the distance between the first bearing 14 and the first rolling element 18. The second bearing 16 can also be moveable relative to a part of the guide 12 and thus also relative to the second rolling element 20 via threaded pins 36. In the embodiment shown here, threaded pins 36 are used, wherein other means for varying the distances are conceivable as well. A variation of the distance is required if, for example, a rubber coating of a rolling element gets weaker due to wear and the diameter of a rolling element is thus decreased, or if the rotation of the rolling elements 18, 20 no longer corresponds to the desired amount. The threaded pins 36 thus serve the purpose of adjusting the pressing force of the bars 14, 16 against the rolling elements 18, 20.

The invention claimed is:

1. A device for turning over identification objects, comprising:
    a receiving device for holding an identification object, wherein the receiving device can be moved from an initial position along a guide,
    a first bearing arranged on the guide in the direction of movement of the receiving device,
    a first rolling element rotatably received in the receiving device, wherein the first rolling element comprises a blocking device, which permits rotation of the receiving device in a first direction only by means of the first rolling element, and
    a drive adapted to move the receiving device along the guide,
    wherein, after movement of the receiving device from the initial position, the first rolling element contacts the first bearing, and wherein, during movement along the first bearing by means of the drive, the first rolling element performs a rotation in the first direction and the receiving device performs a rotation in the first direction via the first rolling element, and wherein, during an opposite movement of the receiving device by means of the drive, the first rolling element performs a rotation in a second direction opposite to the first direction, wherein the blocking device prevents rotation of the receiving device.

2. The device according to claim 1, wherein the guide comprises a second bearing, located at the level of the first bearing, which is opposite to the first bearing in an offset manner, and the receiving device comprises a second rolling element, which is rotatably mounted to the receiving device, wherein the second rolling element comprises a blocking device, which only permits rotation of the receiving device in the first direction by means of the second rolling element.

3. The device according to claim 2, wherein the second bearing is rubberized.

4. The device according to claim 2, wherein the second rolling element is rubberized.

5. The device according to claim 2, wherein the second bearing is a gear rack and the second rolling element is a gear wheel.

6. The device according to claim 2, wherein the blocking device of the second rolling element comprises a free wheel.

7. The device according to claim 2, wherein the second bearing is arranged on the guide in such a manner that the second rolling element only contacts the second bearing after the receiving device has been moved from the initial position by a certain amount.

8. The device according to claim 2, wherein the second bearing is configured as a bar arranged on the guide along the direction of movement of the receiving device.

9. The device according to claim 2, wherein a distance between the second bearing and the second rolling element is adjustable.

10. The device according to claim 2, wherein the first and the second rolling elements have a common axis of rotation.

11. The device according to claim 1, wherein the drive is a hydraulic cylinder, pneumatic cylinder or linear drive unit.

12. The device according to claim 1, wherein the first bearing is rubberized.

13. The device according to claim 1, wherein the first rolling element is rubberized.

14. The device according to claim 1, wherein the first bearing is a gear rack and the first rolling element is a gear wheel.

15. The device according to claim 1, wherein the blocking device of the first rolling element comprises a free wheel.

16. The device according to claim 1, wherein the identification objects are supplied by a conveyor device.

17. The device according to claim 1, wherein the device for holding the identification object comprises two pairs of opposite rollers adapted for resiliently receiving an identification object therebetween.

18. The device according to claim 1, wherein the first bearing is arranged on the guide in such a manner that the first rolling element only contacts the first bearing after the receiving device has been moved from the initial position by a certain amount.

19. The device according to claim 1, wherein the first bearing is configured as a bar arranged on the guide along the direction of movement of the receiving device.

20. The device according to claim 1, wherein a distance between the first bearing and the first rolling element is adjustable.

* * * * *